(12) United States Patent
Xu (10) Patent No.: US 11,147,254 B2
(45) Date of Patent: Oct. 19, 2021

(54) SPINCAST REEL

(71) Applicant: YANGZHOU YUANSHENG MACHINERY CO., LTD., Yangzhou (CN)

(72) Inventor: Zhilin Xu, Yangzhou (CN)

(73) Assignee: YANGZHOU YUANSHENG MACHINERY CO., LTD., Yangzhou (CN)

( * ) Notice: Subject to any disclaimer, the term of this patent is extended or adjusted under 35 U.S.C. 154(b) by 0 days.

(21) Appl. No.: 17/044,741

(22) PCT Filed: Aug. 2, 2018

(86) PCT No.: PCT/CN2018/098380
§ 371 (c)(1),
(2) Date: Oct. 1, 2020

(87) PCT Pub. No.: WO2019/227660
PCT Pub. Date: Dec. 5, 2019

(65) Prior Publication Data
US 2021/0084876 A1    Mar. 25, 2021

(30) Foreign Application Priority Data

May 31, 2018 (CN) .......................... 201810546686.2

(51) Int. Cl.
*A01K 89/01* (2006.01)
*A01K 89/015* (2006.01)
*A01K 89/033* (2006.01)

(52) U.S. Cl.
CPC ........ *A01K 89/0183* (2015.05); *A01K 89/056* (2015.05)

(58) Field of Classification Search
CPC .......... A01K 89/0183; A01K 89/01029; A01K 89/0111; A01K 89/01141; A01K 89/01143; A01K 89/01917; A01K 89/0275
See application file for complete search history.

(56) References Cited

U.S. PATENT DOCUMENTS 3,025,020 A * 3/1962 Sarah ................. A01K 89/0275
242/266
3,108,761 A * 10/1963 Frode ................. A01K 89/0102
242/238

* cited by examiner

*Primary Examiner* — Emmanuel M Marcelo
(74) *Attorney, Agent, or Firm* — Bayramoglu Law Offices LLC (57) ABSTRACT

A spincast reel includes a frame. A rotatable main shaft is mounted on the frame, the periphery of the main shaft is provided with two spiral grooves with reverse spirals, a side of a shaft sleeve opposite to the spiral groove is provided with a kidney-shaped hole, and a transmission claw which passes through the kidney-shaped hole and is slidably installed in the spiral groove is fixed to a reel seat; one end of the main shaft penetrates into the frame and is provided with a driving gear assembly for driving the main shaft to rotate, and the other end thereof is fixedly connected to a line pickup portion. The spincast reel provides uniform line arrangement and prevents partial fishing line tangles during winding.

5 Claims, 6 Drawing Sheets

SPINCAST REEL

CROSS REFERENCE TO THE RELATED APPLICATIONS

This application is the national phase entry of International Application No. PCT/CN2018/098380, filed on Aug. 2, 2018, which is based upon and claims priority to Chinese Patent Application No. 201810546686.2, filed on May 31, 2018, the entire contents of which are incorporated herein by reference.

TECHNICAL FIELD

The present invention relates to the technical field of fishing reels, and in particular to a spincast reel.

BACKGROUND

A fishing reel is an accessory of a fishing rod. In today's fishing activities, the fishing reel is more and more widely used by anglers. Fishing reels fall into spinning reels, drum reels, spincast reels, etc. When the spincast reel is used, the bait is pushed out by a normal throwing motion, so that a fishing line wound around a spool is released, and thus the spool freely rotates. When the fishing line needs to be withdrawn, a handle is rotated to drive a line pickup portion to rotate, and a pin arranged on the line pickup portion captures the fishing line and winds the fishing line around the spool to complete the pickup. The spool of the spincast reel is arranged in a front cover, and the fishing line gets in and out through a through hole of the front cover. Therefore, line winding and unwinding are invisible, and line damage and line disorder of the spinning reel are directly prevented. However, the spincast reel still has the following problems during use: uneven line arrangement generally occurs when withdrawing the line, coils wound by the line on the spool may be partially stacked, resulting in an increasingly enlarged coil diameter, and the line gets stuck easily, affecting the use effects.

SUMMARY

The present invention provides a spincast reel which prevents partial fishing line tangles during winding.

To achieve the foregoing purpose, the present invention adopts the following technical solutions:

A spincast reel includes a frame. A rotatable main shaft is mounted on the frame, the frame is provided with a shaft sleeve that is sleeved on the periphery of the main shaft, the shaft sleeve is provided with a reel seat reciprocating along the main shaft and a locating piece for circumferentially positioning the reel seat. The reel seat is sleeved with a rotatable spool, and the spool is axially positioned on an outer side of the reel seat. The periphery of the main shaft is provided with two spiral grooves with reverse spirals, both ends of the two spiral grooves are communicated with each other, a side of the shaft sleeve opposite to the spiral groove is provided with a kidney-shaped hole, and a transmission claw which passes through the kidney-shaped hole and is slidably installed in the spiral groove that is fixed to the reel seat. One end of the main shaft penetrates into the frame and is provided with a driving gear assembly for driving the main shaft to rotate, the other end thereof is fixedly connected to a line pickup portion sleeved on the periphery of the spool, and a channel that facilitates the winding of a fishing line is reserved between the line pickup portion and the spool. The periphery of the line pickup portion is covered with a front cover detachably mounted on the frame, one side of the front cover is provided with a through hole for the fishing line to get in and out, the through hole and the main shaft are coaxial, a gap for the fishing line to pass through is reserved between the line pickup portion and the front cover, a side of the line pickup portion opposite to an inner wall of the front cover is provided with a pin that facilitates capture of the fishing line during winding, and the reel seat is provided with a braking mechanism for braking the spool. In the present invention, the rotation of the main shaft drives the transmission claw to slide in the spiral grooves. When the transmission claw slides to an end of one of the spiral grooves, since both ends of the two spiral grooves are communicated with each other, the transmission claw continues to slide along the other spiral groove to drive the reel seat to reciprocate and drive the spool to reciprocate. Besides, the rotation of the main shaft drives the line pickup portion to rotate, the pin captures the fishing line, which is wound under the rotation of the line pickup portion. Additionally, the main shaft cooperates with the reciprocating spool during line winding, the fishing line sequentially passes through the through hole and enters the gap between the line pickup portion and the front cover, then, enters into the channel between the line pickup portion and the spool to complete the line winding, so that the fishing line is evenly wound around the spool back and forth. This arrangement directly avoids partial fishing line tangles during line arrangement.

Preferably, the locating piece includes an external spline arranged on the periphery of the shaft sleeve, and also includes an internal spline arranged on an inner wall of the reel seat and matched with the external spline. The external spline cooperates with the internal spline to prevent the reel seat from rotating along the circumferential direction of the shaft sleeve. Because the shaft sleeve is fixed to the frame, the reel seat is circumferentially positioned, so that the reel seat can only reciprocate along an axial length of the main shaft under the rotation of the main shaft.

Preferably, the locating piece includes a guidepost arranged on the reel seat, and the frame is provided with a mounting hole into which the guidepost is inserted. One end of the guidepost is fixed to the reel seat, and the other end thereof movably penetrates into the mounting hole. The guidepost is inserted in the mounting hole of the frame, so that the reel seat cannot rotate and can only be axially moved under the guidance of the mounting hole, thus implementing the circumferential positioning of the reel seat.

Preferably, the driving gear assembly includes a driven gear that is arranged at one end of the main shaft, the driven gear is engaged with a driving gear, the driving gear is provided with a worm gear that is connected to the frame through the main shaft, and a driving handle is installed on the worm gear. The driving handle drives the worm gear to rotate, so as to actuate the driving gear to rotate, and the driving gear rotates to actuate the driven gear to rotate to eventually drive the main shaft to rotate.

Preferably, the braking mechanism includes a large rotatable gear sleeved at one end of the reel seat, the large rotatable gear abuts against the spool, an end face of the large rotatable gear is provided with a first helical surface, one end of the reel seat is provided with a second helical surface matched with the first helical surface, and the other end of the reel seat is provided with a brake pad for pressing against the spool. Through the arrangement of the braking mechanism, the spool is braked after the fish swallows the bait. This prevents the failure to pull up the fish caused by the rotation of the spool. The braking mechanism squeezes the spool by rotating the large gear, the end face of the large gear is provided with the first helical surface, the reel seat is provided with the second helical surface matched with the first helical surface, and the other end of the reel seat is provided with the brake pad. The large rotatable gear is rotated, so that a higher end of the first helical surface of the large rotatable gear presses against a higher end of the second helical surface by rotation, and the reel seat moves and presses the spool. The spool is tightly pressed by the brake pad, so that the spool tightly abuts against the reel seat and does not rotate along the circumferential direction of the reel seat, thus implementing braking. In this case, the fish is pulled up by winding the line.

Compared with the prior art, the present invention has the following advantages:

In the present invention, a reel seat is circumferentially positioned by arranging a locating piece, and then the reel seat is driven to reciprocate along an axial length of a main shaft by rotating the main shaft. The periphery of the main shaft is provided with two spiral grooves with reverse spirals, and the reel seat is provided with a transmission claw slidably installed in the spiral groove. The periphery of the main shaft is sleeved with a shaft sleeve fixed to a frame, and a kidney-shaped hole for the transmission claw to pass through is formed at the position of the shaft sleeve located in the spiral groove. In this case, the rotation of the main shaft drives the transmission claw to slide in the spiral grooves. When the transmission claw slides to an end of one of the spiral grooves, since both ends of the two spiral grooves are communicated with each other, the transmission claw continues to slide along the other spiral groove to drive the reel seat to reciprocate. Since the spool is axially positioned on the outer side of the reel seat, the spool is driven to reciprocate through the reciprocating motion of the reel seat. The rotation of the main shaft drives a line pickup portion to rotate, so that a pin arranged on the line pickup portion captures the fishing line, which is wound under the rotation of the line pickup portion. The main shaft cooperates with the reciprocating spool during line winding. The fishing line sequentially passes through a through hole and enters a gap between the line pickup portion and a front cover, and then enters into a channel between the line pickup portion and the spool to complete the line winding, so that the fishing line is evenly wound around the spool back and forth. This design directly avoids partial fishing line tangles during line arrangement, ensures uniform line arrangement on the spool, which is reasonable in design and facilitates use.

In the figures: 1. front cover, 2. line pickup portion, 3. shaft sleeve, 4. main shaft, 5. reel seat, 6. spool, 7. frame, 8. braking mechanism, 81. small gear, 82. large gear, 83. brake axle, 84. brake button, 85. first helical surface, 86. second helical surface, 9. driving gear assembly, 91. handle, 92. rocking bar, 93. driven gear, 94. driving handle, 95. driving gear, 96. worm gear, 10. clamp spring, 11. through hole, 12. transmission claw, 13. pin, 14. gap, 15. fishing line, 16. channel, 17. spiral groove, 18. internal spline, 19. external spline, 20. guidepost, 21. mounting hole, 22. kidney-shaped hole, 23. brake pad.

DETAILED DESCRIPTION OF THE EMBODIMENTS

The present invention is further described below with reference to specific examples. It should be understood that these examples are only intended to illustrate the present invention and are not intended to limit the scope of the present invention. Various equivalent modifications of the present invention made by those skilled in the art after reading the present invention shall still fall within the scope defined by the appended claims of the present application.

Example 1

As shown in FIGS. 1-6, a spincast reel includes the frame 7. The rotatable main shaft 4 is mounted on the frame 7, the frame 7 is provided with the shaft sleeve 3 that is sleeved on the periphery of the main shaft 4, the shaft sleeve 3 is provided with the reel seat 5 reciprocating along the main shaft 4 and a locating piece for circumferentially positioning the reel seat 5, the reel seat 5 is sleeved with the rotatable spool 6, and the spool 6 is axially positioned on an outer side of the reel seat 5 through the clamp spring 10. The shaft sleeve 3, the reel seat 5, and the spool 6 are coaxially arranged. The locating piece includes the external spline 19 arranged on the periphery of the shaft sleeve 3, and also includes the internal spline 18 arranged on an inner wall of the reel seat 5 and matched with the external spline 19. The external spline 19 cooperates with the internal spline 18 to prevent the reel seat 5 from rotating along the circumferential direction of the shaft sleeve 3. Because the shaft sleeve 3 is fixed to the frame 7, the reel seat 5 is circumferentially positioned, so that the reel seat 5 can only reciprocate along an axial length of the main shaft 4 under the rotation of the main shaft 4. The periphery of the main shaft 4 is provided with two spiral grooves 17 with reverse spirals, both ends of the two spiral grooves 17 communicate with each other, one side of the shaft sleeve 3 opposite to the spiral groove 17 is provided with the kidney-shaped hole 22, and the transmission claw 12, which passes through the kidney-shaped hole 22 and is slidably installed in the spiral groove 17, is fixed to the reel seat 5. The rotation of the main shaft 4 drives the transmission claw 12 to slide in the spiral grooves 17. When the transmission claw 12 slides to one end of one of the spiral grooves 17, since both ends of the two spiral grooves 17 communicate with each other, the transmission claw 12 continues to slide along the other spiral groove 17 to drive the reel seat 5 to reciprocate. One end of the main shaft 4 penetrates into the frame 7, and is provided with the driving gear assembly 9 for driving the main shaft to rotate. The driving gear assembly 9 includes the driven gear 93 arranged at one end of the main shaft 4, the driven gear 93 is engaged with the driving gear 95, the driving gear 95 is provided with the worm gear 96 that is connected to the frame 7 through the main shaft 4, and the driving handle 94 is installed on the worm gear 96. The driving handle 94 includes the rocking bar 92 perpendicular to the worm gear 96, and the rocking bar 92 is provided with the handle 91 facilitating rotation. The handle 91 drives the rocking bar 92 to rotate, so as to drive the worm gear 96 and the driving gear 95 to rotate, and the driving gear 95 rotates to actuate the driven gear 93 to rotate, which drives the main shaft 4 to rotate. The other end of the main shaft 4 is fixedly connected to the line pickup portion 2 located on the periphery of the spool 6 and coaxial with the spool 6, and the channel 16 that facilitates the winding of the fishing line 15 is always reserved between the line pickup portion 2 and the spool 6. The periphery of the line pickup portion 2 is covered with the front cover 1 detachably mounted on the frame 7, a side of the front cover 1 is provided with the through hole 11 for the fishing line 15 to get in and out, and the through hole 11 and the main shaft 4 are coaxial. The gap 14 for the fishing line 15 to pass through is reserved between the line pickup portion 2 and the front cover 1, and one side of the line pickup portion 2 opposite to an inner wall of the front cover 1 is provided with the pin 13 that facilitates capture of the fishing line 15 during winding. The main shaft 4 rotates to drive the line pickup portion 2 to rotate, so that the pin 13 arranged on the line pickup portion 2 captures the fishing line 15, and the line is wound under the rotation of the line pickup portion 2. The main shaft cooperates with the reciprocating spool 6 during line winding. The fishing line 15 sequentially passes through the through hole 11 and enters the gap 14 between the line pickup portion 2 and the front cover 1, and then, enters the channel 16 between the line pickup portion 2 and the spool 6 to complete line winding, so that the fishing line 15 is evenly wound around the spool 6 back and forth. This directly avoids partial tangles of the fishing line 15 during line arrangement, and ensures a uniform line arrangement on the spool 6, which is an optimized design that made it easy to usage. The reel seat 5 is provided with the braking mechanism 8 for braking the spool 6. The braking mechanism 8 includes the rotatable brake button 84 arranged on the frame 7, the brake axle 83 in linkage with the brake button 84 movably penetrates into a central position of the brake button 84, one end of the brake axle 83 is connected to the brake button 84, and the other end thereof is in linkage with the small gear 81 mounted on the reel seat 5. The small gear 81 is engaged with and connected to the large gear 82 sleeved at one end of the reel seat 5. The large gear 82 abuts against the spool 6, an end face of the large gear 82 is provided with the first helical surface 85, one end of the reel seat 5 is provided with the second helical surface 86 matched with the first helical surface 85, and the other end of the reel seat 5 is provided with the brake pad 23 for pressing against the spool 6. The brake button 84 is poked to drive the brake axle 83 to rotate, so as to drive the small gear 81 to rotate, so that the large gear 82 engaged with the small gear 81 rotates. The inner wall of the large gear 82 abutting against the reel seat 5 is provided with the first helical surface 85, and the periphery of the reel seat 5 is provided with the second helical surface 86 abutting against the first helical surface 85. The large gear 82 is rotated, so that a higher end of the first helical surface 85 of the large gear 82 presses against a higher end of the second helical surface 86 by rotation, and the reel seat 5 moves and presses towards the spool 6. The spool 6 is tightly pressed by the brake pad 23, so that the spool 6 tightly abuts against the reel seat 5, and the spool 6 does not rotate along the circumferential direction of the reel seat 5, thus implementing braking. In this case, the fish is pulled up by winding the line.

The specific working process and principle of the present invention are as follows: The spool 6 is braked through the braking mechanism 8 after the fish swallows the bait. This prevents the rotation of the spool 6 from unwinding the line, which makes it hard to pull up fish. In this case, the brake button 84 is triggered to rotate the brake axle 83, so as to drive the small gear 81 to rotate, and the large gear 82 engaged with the small gear 81 rotates simultaneously. The inner wall of the large gear 82 abutting against the reel seat 5 is provided with the first helical surface 85, and the periphery of the reel seat 5 is provided with the second helical surface 86 abutting against the first helical surface 85. The large gear 82 is rotated, so that the higher end of the first helical surface 85 of the large gear 82 presses against the higher end of the second helical surface 86 by rotation, and the reel seat 5 moves and presses the spool 6. The spool 6 is tightly pressed by the brake pad 23, so that the spool 6 tightly abuts against the reel seat 5, and the spool 6 does not rotate along the circumferential direction of the reel seat 5, thus implementing braking. In this case, during the motion of pulling up a fish, the fish is pulled up by winding the line. During line winding, the handle 91 drives the rocking bar 92 to rotate and drives the worm gear 96 and the driving gear 95 to rotate, and the driving gear 95 drives the driven gear 93 to rotate, thus driving the main shaft 4 to rotate. As a result, the line pickup portion 2 fixedly connected to one end of the main shaft 4 rotates. In this case, the fishing line 15 is captured through the pin 13 on the line pickup portion 2, and the fishing line 15 is driven to be continuously wound around the spool 6. Besides, the external spline 19 cooperates with the internal spline 18 to prevent the reel seat 5 from rotating along the circumferential direction of the shaft sleeve 3. Because the shaft sleeve 3 is fixed to the frame 7, the reel seat 5 is circumferentially positioned, and then the main shaft 4 rotates to drive the reel seat 5 to reciprocate along an axial length of the main shaft 4. The periphery of the main shaft 4 is provided with the two spiral grooves 17 with the reverse spirals, and the reel seat 5 is provided with the transmission claw 12 slidably installed in the spiral groove 17. The periphery of the main shaft 4 is sleeved with the shaft sleeve 3 fixed to the frame 7, and the kidney-shaped hole 22 for the transmission claw 12 to pass through is formed at the position of the shaft sleeve 3 that is located in the spiral groove 17. In this case, the rotation of the main shaft 4 drives the transmission claw 12 to slide in the spiral groove 17. When the transmission claw 12 slides to an end of one of the spiral grooves 17, since both ends of the two spiral grooves 17 communicate with each other, the transmission claw 12 continues to slide along the other spiral groove 17 to drive the reel seat 5 to reciprocate. Because the spool 6 is installed on the reel seat 5 through the clamp spring 10, the reciprocation of the reel seat 5 drives the spool 6 to reciprocate, the reciprocating spool 6 is matched with the rotating line pickup portion 2, and the line is wound through the rotation of the rotating line pickup portion 2. The fishing line 15 sequentially passes through the through hole 11 and enters the gap 14 between the line pickup portion 2 and the front cover 1, and then enters the channel 16 between the line pickup portion 2 and the spool 6 to complete the line winding, so that the fishing line 15 is evenly wound around the spool 6 back and forth. This design directly avoids partial tangles of the fishing line 15 during line arrangement, and ensures a uniform line arrangement on the spool 6, which is an optimized design that made it easy to usage.

Example 2

Figures 1, 2:
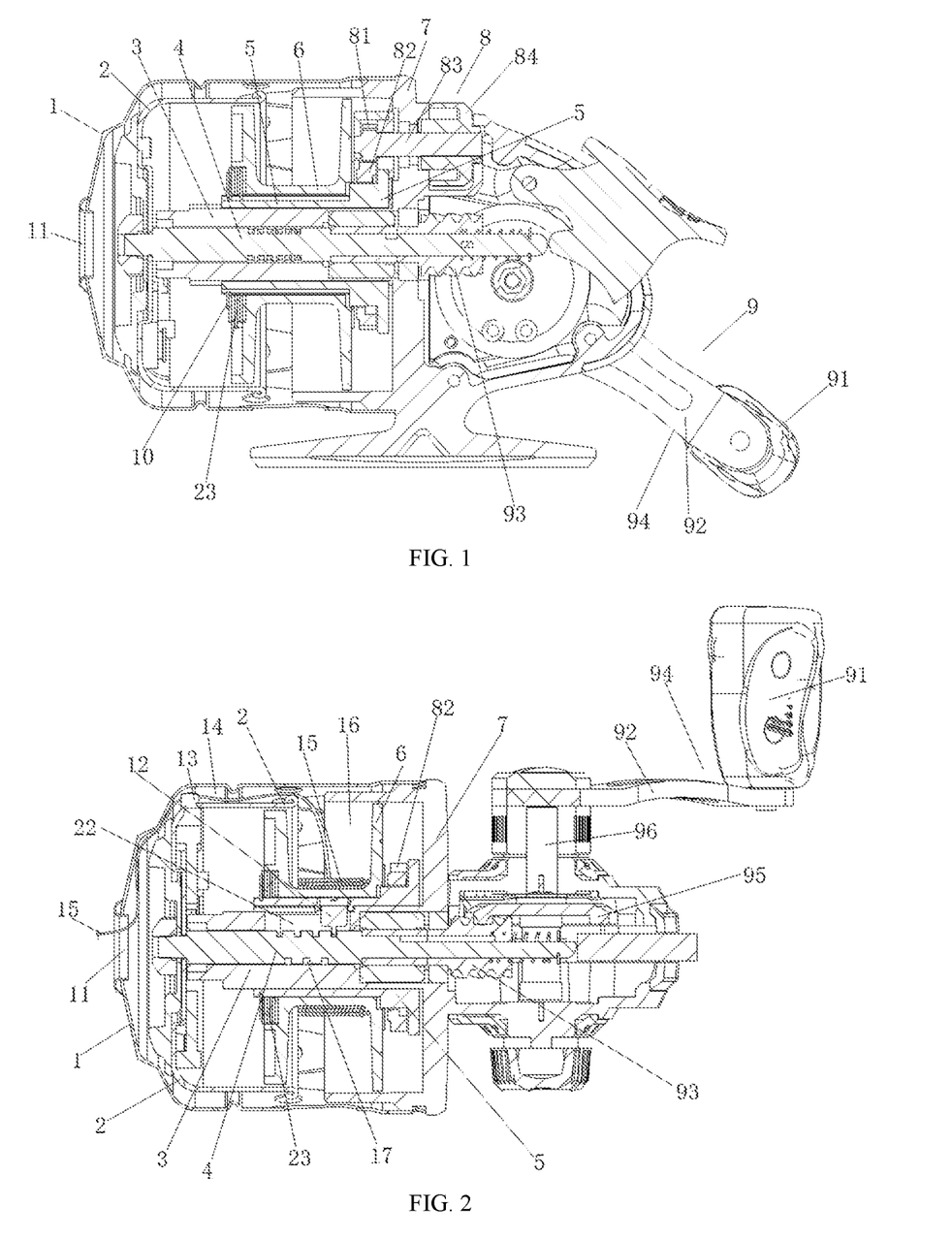
FIG. 1 is a schematic structural diagram of a first embodiment according to the present invention.
FIG. 2 is a top cross-sectional view of the first embodiment shown in FIG. 1.
Figure 3:
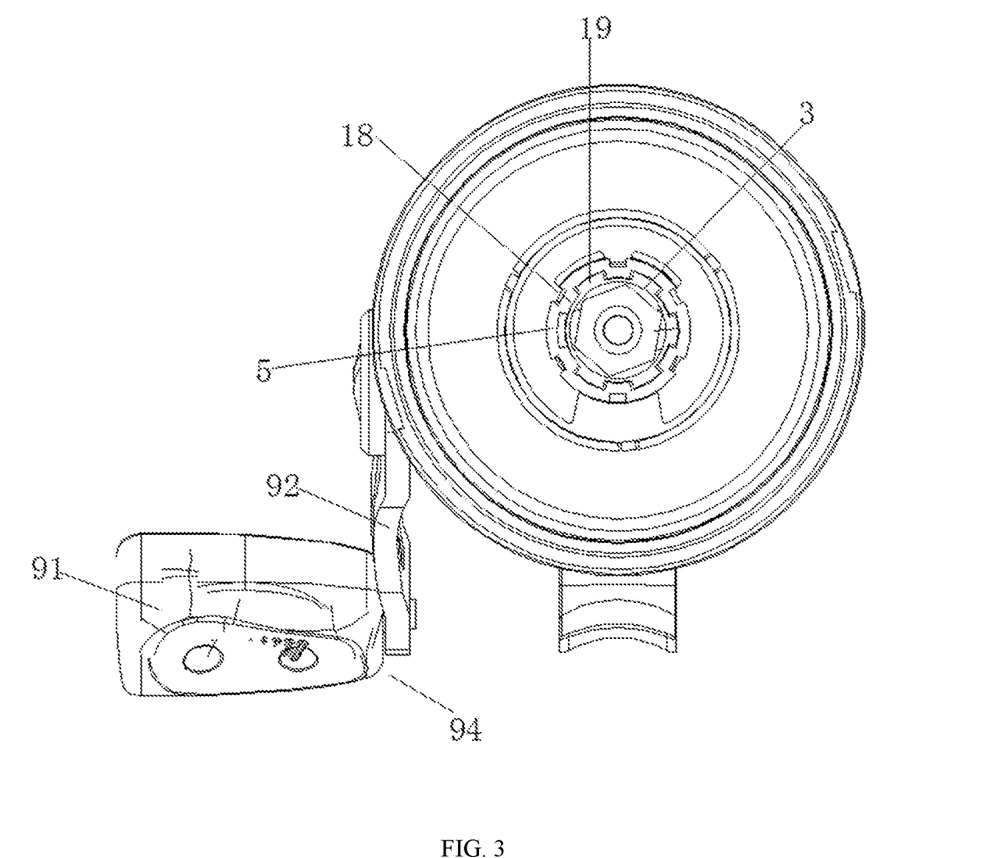
FIG. 3 is an installation structural diagram of a reel seat and a shaft sleeve according to the present invention.
Figure 4:
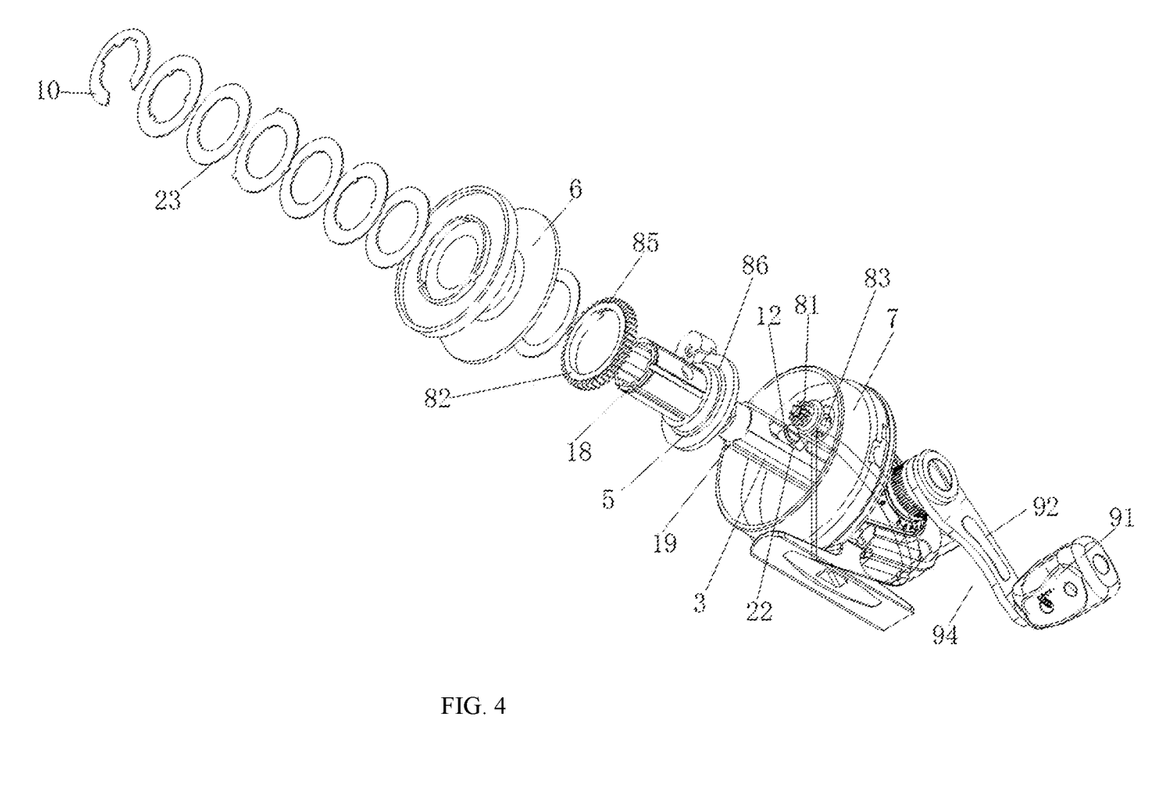
FIG. 4 is an exploded view of the first embodiment shown in FIG. 1.
Figure 5:
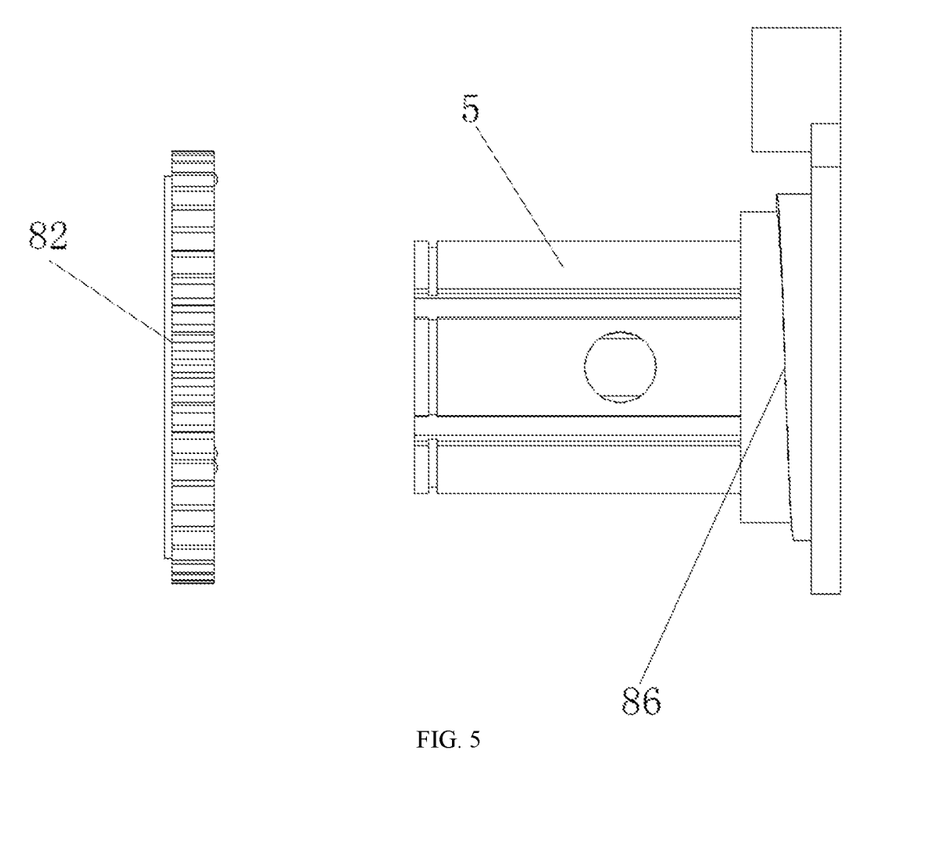
FIG. 5 is an exploded view showing a reel seat and a large gear according to the present invention.
Figure 6:
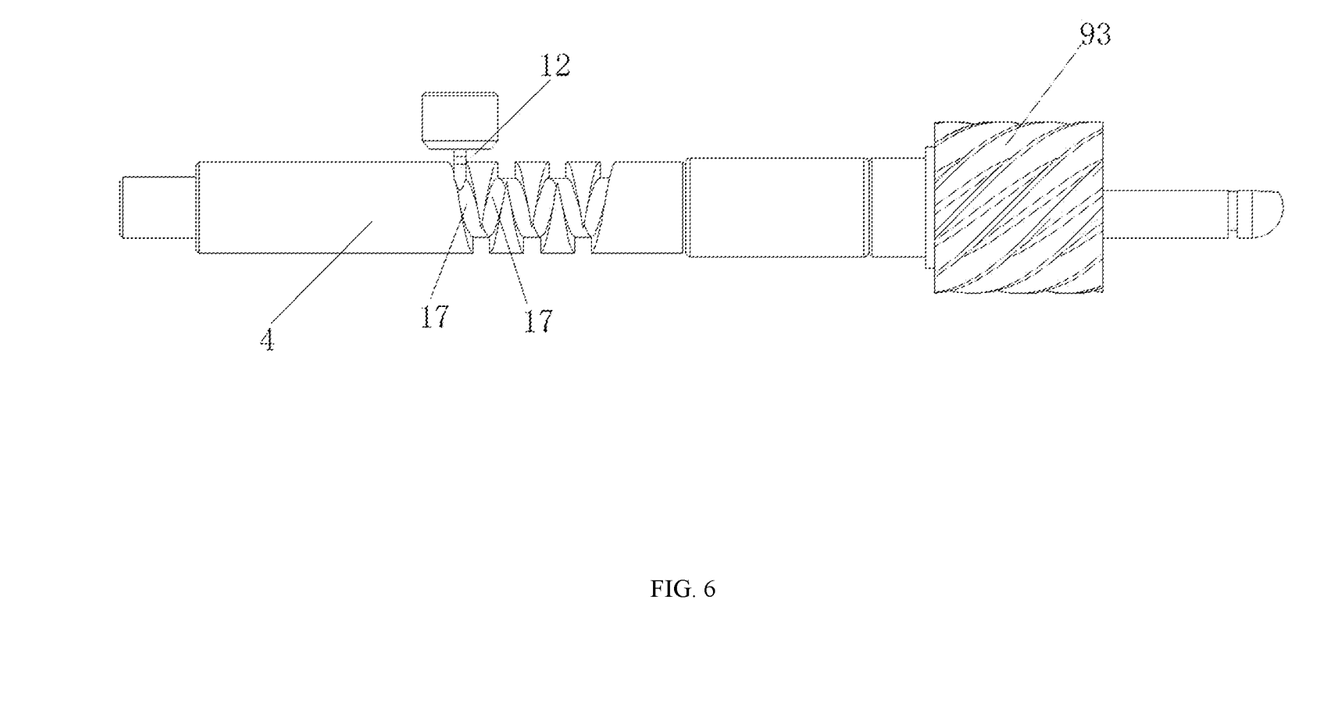
FIG. 6 is an installation structural diagram of a main shaft and a transmission claw according to the present invention.
Figure 7:
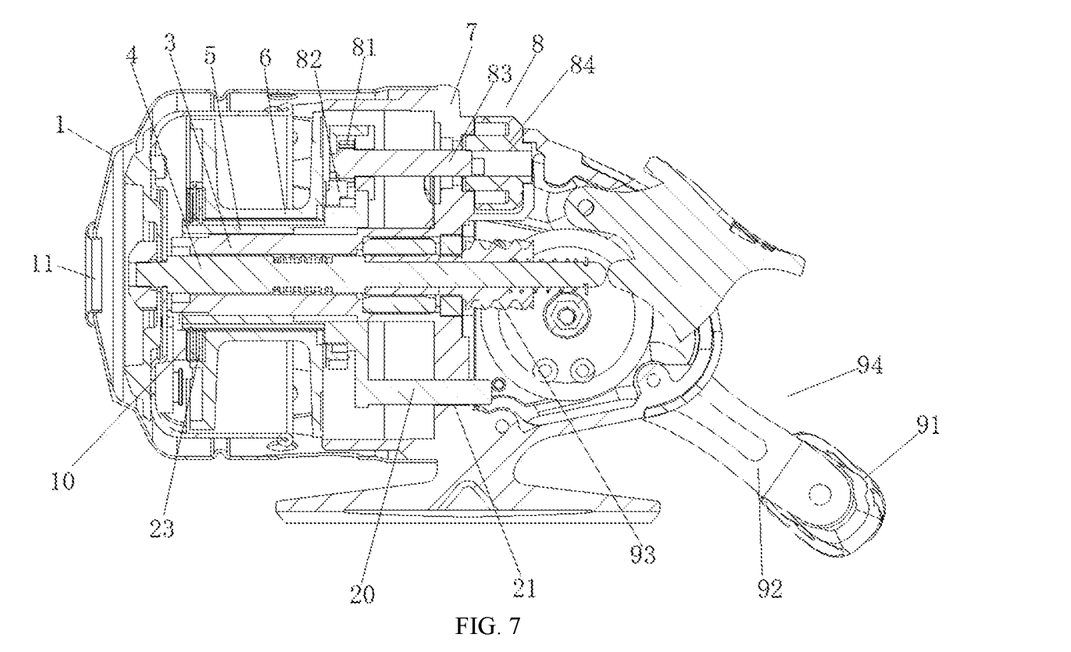
FIG. 7 is a schematic structural diagram of a second embodiment of the present invention.
Figure 8:
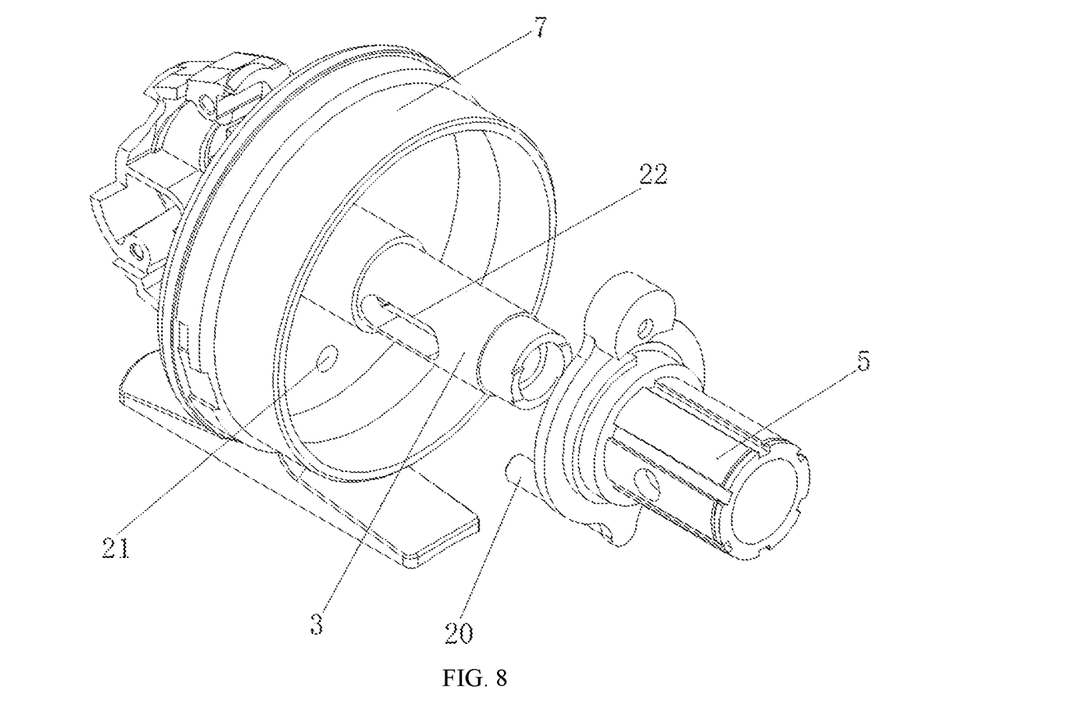
FIG. 8 is an exploded view of a reel seat and a shaft sleeve of the second embodiment shown in FIG. 7.

As shown in FIGS. 6-8, a spincast reel includes the frame 7. The rotatable main shaft 4 is mounted on the frame 7, the frame 7 is provided with the shaft sleeve 3 sleeved on the periphery of the main shaft 4, the shaft sleeve 3 is provided with the reel seat 5 reciprocating along the main shaft 4 and a locating piece for circumferentially positioning the reel seat 5, the reel seat 5 is sleeved with the rotatable spool 6, and the spool 6 is axially positioned on an outer side of the reel seat 5 through the clamp spring 10. The shaft sleeve 3, the reel seat 5 and the spool 6 are coaxially arranged. The locating piece includes the guidepost 20 arranged on the reel seat 5, the frame 7 is provided with the mounting hole 21 for the guidepost 20 to be inserted, one end of the guidepost 20 is fixed to the spool and the other end thereof movably penetrates into the mounting hole 21. The guidepost 20 is inserted in the mounting hole 21 of the frame 7, so that the reel seat 5 cannot rotate, and can only be axially moved under the guidance of the mounting hole 21, which implements the circumferential positioning of the reel seat 5. The periphery of the main shaft 4 is provided with two spiral grooves 17 with reverse spirals, both ends of the two spiral grooves 17 communicate with each other, a side of the shaft sleeve 3 opposite to the spiral groove 17 is provided with the kidney-shaped hole 22, and the transmission claw 12 which passes through the kidney-shaped hole 22 and is slidably installed in the spiral groove 17 is fixed to the reel seat 5. The rotation of the main shaft 4 drives the transmission claw 12 to slide in the spiral groove 17. When the transmission claw 12 slides to an end of one of the spiral grooves 17, since both ends of the two spiral grooves 17 communicate with each other, the transmission claw 12 continues to slide along the other spiral groove 17 to drive the reel seat 5 to reciprocate. One end of the main shaft 4 penetrates into the frame 7 and is provided with the driving gear assembly 9 for driving the main shaft to rotate. The driving gear assembly 9 includes the driven gear 93 arranged at one end of the main shaft 4, the driven gear 93 is engaged with the driving gear 95, the driving gear 95 is provided with the worm gear 96 that is connected to the frame 7 through the main shaft 4, and the driving handle 94 is installed on the worm gear 96. The driving handle 94 includes the rocking bar 92 perpendicular to the worm gear 96, and the rocking bar 92 is provided with the handle 91 facilitating rotation. The handle 91 drives the rocking bar 92 to rotate, so as to drive the worm gear 96 and the driving gear 95 to rotate, and the driving gear 95 drives the driven gear 93 to rotate, thus driving the main shaft 4 to rotate. The other end of the main shaft 4 is fixedly connected to the line pickup portion 2 located on the periphery of the spool 6 and coaxial with the spool 6, and the channel 16 that facilitates the winding of the fishing line 15 is always reserved between the line pickup portion 2 and the spool 6. The periphery of the line pickup portion 2 is covered with the front cover 1 detachably mounted on the frame 7, one side of the front cover 1 is provided with the through hole 11 for the fishing line 15 to get in and out, and the through hole 11 and the main shaft 4 are coaxial. The gap 14 for the fishing line 15 to pass through is reserved between the line pickup portion 2 and the front cover 1, and the side of the line pickup portion 2 that is opposite to an inner wall of the front cover 1 is provided with the pin 13 that facilitates capture of the fishing line 15 during winding. The main shaft 4 rotates to drive the line pickup portion 2 to rotate, so that the pin 13 arranged on the line pickup portion 2 captures the fishing line 15, and the line is wound under the rotation of the line pickup portion 2. The main shaft cooperates with the reciprocating spool 6 during line winding. The fishing line 15 sequentially passes through the through hole 11 and enters the gap 14 between the line pickup portion 2 and the front cover 1, and then enters the channel 16 between the line pickup portion 2 and the spool 6 to complete the line winding, so that the fishing line 15 is evenly wound around the spool 6 back and forth. This directly avoids partial tangles of the fishing line 15 during line arrangement, and ensures uniform line arrangement on the spool 6, which is reasonable in design and facilitates use. The reel seat 5 is provided with the braking mechanism 8 for braking the spool 6. The braking mechanism 8 includes the rotatable brake button 84 arranged on the frame 7, the brake axle 83 in linkage with the brake button 84 movably penetrates into a central position of the brake button 84, one end of the brake axle 83 is connected to the brake button 84, and the other end thereof is in linkage with the small gear 81 mounted on the reel seat 5. The small gear 81 is engaged with and connected to the large gear 82 sleeved at one end of the reel seat 5. The large gear 82 abuts against the spool 6, an end face of the large gear 82 is provided with the first helical surface 85, one end of the reel seat 5 is provided with the second helical surface 86 matched with the first helical surface 85, and the other end of the reel seat 5 is provided with the brake pad 23 for pressing against the spool 6. The brake button 84 is poked to drive the brake axle 83 to rotate, so as to drive the small gear 81 to rotate, and the large gear 82 engaged with the small gear 81 rotates simultaneously. The inner wall of the large gear 82 abutting against the reel seat 5 is provided with the first helical surface 85, and the periphery of the reel seat 5 is provided with the second helical surface 86 abutting against the first helical surface 85. The large gear 82 is rotated, so that a higher end of the first helical surface 85 of the large gear 82 presses against a higher end of the second helical surface 86 by rotation, and the reel seat 5 moves and presses the spool 6. The spool 6 is tightly pressed by the brake pad 23, so that the spool 6 tightly abuts against the reel seat 5, and the spool 6 does not rotate along the circumferential direction of the reel seat 5, thus implementing braking. In this case, the fish is pulled up by winding the line.

The specific working process and principle of the present invention are as follows: The spool 6 is braked through the braking mechanism 8 after the fish swallows the bait. This prevents the rotation of the spool 6 rotates from unwinding the line, which stops the fish from been pulled up. In this case, the brake button 84 is triggered to drive the brake axle 83 to rotate, so as to drive the small gear 81 to rotate, and the large gear 82 engaged with the small gear 81 rotates simultaneously. The inner wall of the large gear 82 abutting against the reel seat 5 is provided with the first helical surface 85, and the periphery of the reel seat 5 is provided with the second helical surface 86 abutting against the first helical surface 85. The large gear 82 is rotated, so that the higher end of the first helical surface 85 of the large gear 82 presses against the higher end of the second helical surface 86 by rotation, and the reel seat 5 moves and presses towards the spool 6. The spool 6 is tightly pressed by the brake pad 23, so that the spool 6 tightly abuts pressed against the reel seat 5, and the spool 6 does not rotate along the circumferential direction of the reel seat 5, which implements braking. In this case, the fish is pulled up by winding the line. During line winding, the handle 91 drives the rocking bar 92 to rotate and drives the worm gear 96 and the driving gear 95 to rotate, and the driving gear 95 drives the driven gear 93 to rotate, thus driving the main shaft 4 to rotate. As a result, the line pickup portion 2 fixedly connected to one end of the main shaft 4 rotates. In this case, the fishing line 15 is captured through the pin 13 on the line pickup portion 2, and the fishing line 15 is driven to be continuously wound around the spool 6. Besides, the guidepost 20 is inserted in the mounting hole 21 of the frame 7, so that the reel seat 5 cannot rotate and can only be axially moved under the guidance of the mounting hole 21, thus implementing the circumferential positioning of the reel seat 5. Then the main shaft 4 rotates to drive the reel seat 5 to reciprocate along an axial length of the main shaft 4. The periphery of the main shaft 4 is provided with the two spiral grooves 17 with the reverse spirals, and the reel seat 5 is provided with the transmission claw 12 slidably installed in the spiral groove 17. The periphery of the main shaft 4 is sleeved with the shaft sleeve 3 fixed to the frame 7, and the kidney-shaped hole 22 for the transmission claw 12 to pass through is formed at the position of the shaft sleeve 3 located in the spiral groove 17. In this case, the rotation of the main shaft 4 drives the transmission claw 12 to slide in the spiral grooves 17. When the transmission claw 12 slides to an end of one of the spiral grooves 17, since both ends of the two spiral grooves 17 communicate with each other, the transmission claw 12 continues to slide along the other spiral groove 17 to drive the reel seat 5 to reciprocate. Since the spool 6 is installed on the reel seat 5 through the clamp spring 10, the reciprocation of the reel seat 5 drives the spool 6 to reciprocate, the reciprocating spool 6 is matched with the rotating line pickup portion 2, and the line is wound through the rotation of the rotating line pickup portion 2. The fishing line 15 sequentially passes through the through hole 11 and enters the gap 14 between the line pickup portion 2 and the front cover 1, and then enters the channel 16 between the line pickup portion 2 and the spool 6 to complete the line winding, so that the fishing line 15 is evenly wound around the spool 6 back and forth. This directly avoids partial tangles of the fishing line 15 during line arrangement, and ensures uniform line arrangement on the spool 6, which is reasonable in design and facilitates use.

What is claimed is:

1. A spincast reel, comprising:
a frame,
wherein a rotatable main shaft is mounted on the frame, wherein the frame is provided with a shaft sleeve, and the shaft sleeve is sleeved on a periphery of the main shaft, wherein the shaft sleeve is provided with a reel seat and a locating piece, the reel seat reciprocates along the main shaft and the locating piece is configured for circumferentially positioning the reel seat, wherein the reel seat is sleeved with a rotatable spool, and the rotatable spool is axially positioned on an outer side of the reel seat;
wherein the periphery of the main shaft is provided with two spiral grooves with reverse spirals, wherein both ends of the two spiral grooves communicate with each other, a side of the shaft sleeve opposite to each of the two spiral grooves is provided with a kidney-shaped hole, and a transmission claw is fixed to the reel seat, the transmission claw passes through the kidney-shaped hole and is slidably installed in the spiral groove a first end of the main shaft penetrates into the frame and is provided with a driving gear assembly for driving the main shaft to rotate, a second end of the main shaft is fixedly connected to a line pickup portion, the line pickup portion is sleeved on a periphery of the rotatable spool, and a channel facilitates a winding of a fishing line and is reserved between the line pickup portion and the rotatable spool; a periphery of the line pickup portion is covered with a front cover, the front cover is detachably mounted on the frame, a side of the front cover is provided with a through hole for the fishing line to get in and out, the through hole and the main shaft are coaxial, a gap for the fishing line to pass through is reserved between the line pickup portion and the front cover, a side of the line pickup portion opposite to an inner wall of the front cover is provided with a pin, the pin facilitates a capture of the fishing line during the winding, and the reel seat is provided with a braking mechanism for braking the rotatable spool.

2. The spincast reel according to claim 1, wherein the locating piece comprises an external spline and an inner spline, the external spline is arranged on the a periphery of the shaft sleeve, and the internal spline is arranged on an inner wall of the reel seat and matched with the external spline.

3. The spincast reel according to claim 1, wherein the locating piece comprises a guidepost, and the guidepost is arranged on the reel seat, wherein the frame is provided with a mounting hole, the guidepost is inserted into the mounting hole, a first end of the guidepost is fixed to the reel seat, and second end of the guidepost movably penetrates into the mounting hole.

4. The spincast reel according to claim 1, wherein the driving gear assembly comprises a driven gear, the driven gear is arranged at the first end of the main shaft, the driven gear is engaged with a driving gear, the driving gear is provided with a worm gear, the worm gear is connected to the frame through the main shaft, and a driving handle is installed on the worm gear.

5. The spincast reel according to claim 1, wherein the braking mechanism comprises a rotatable gear, and the rotatable gear is sleeved at a first end of the reel seat, wherein the rotatable gear abuts against the rotatable spool, an end face of the rotatable gear is provided with a first helical surface, the first end of the reel seat is provided with a second helical surface, the second helical surface is matched with the first helical surface, and a second end of the reel seat is provided with a brake pad for pressing against the rotatable spool.

* * * * *